3,060,480
WINDSHIELD WIPER BLADE
Eugene R. Ziegler, Spencerport, N.Y., assignor to General Motors Corporation, Detroit, Mich., a corporation of Delaware
Filed July 24, 1959, Ser. No. 829,250
21 Claims. (Cl. 15—250.42)

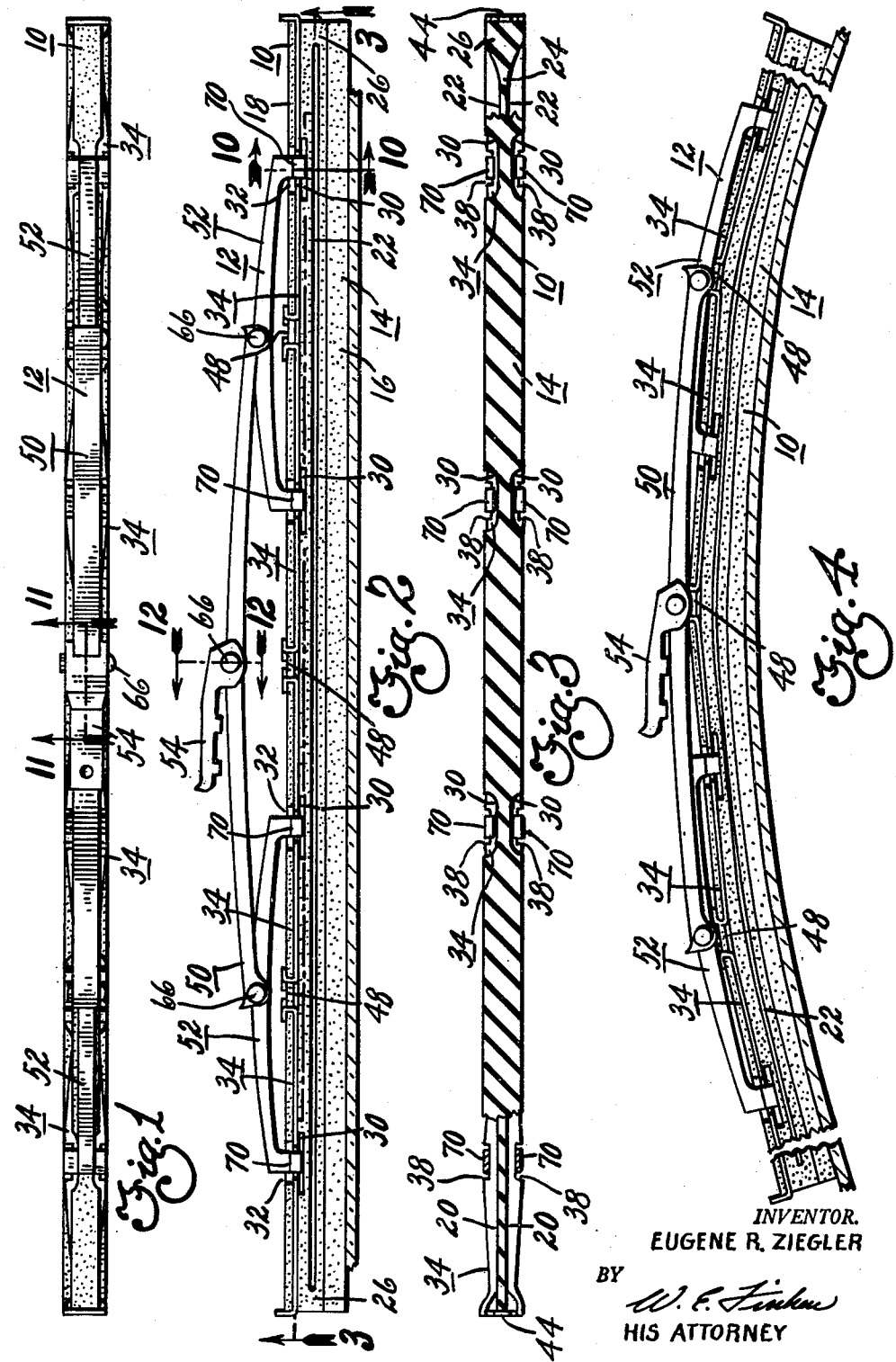

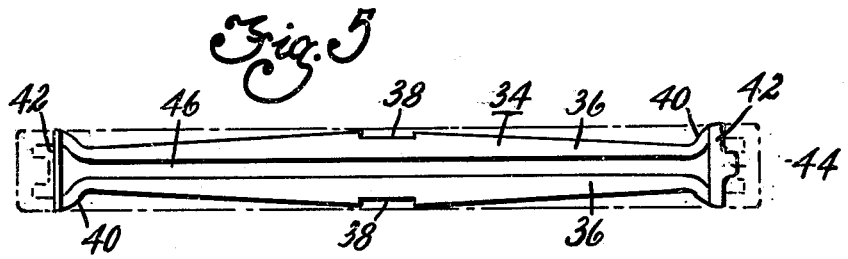
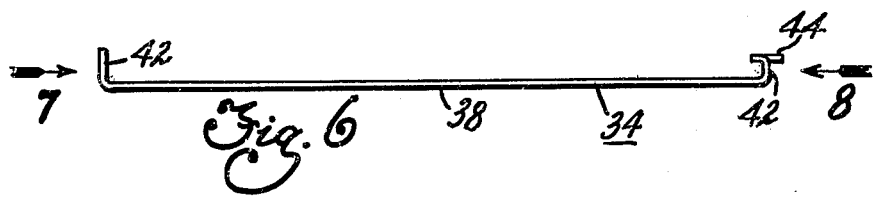
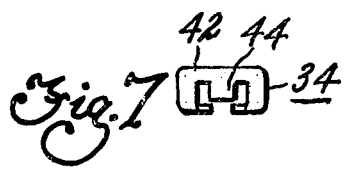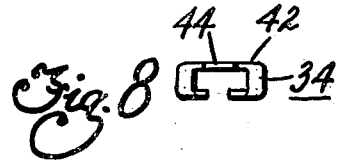
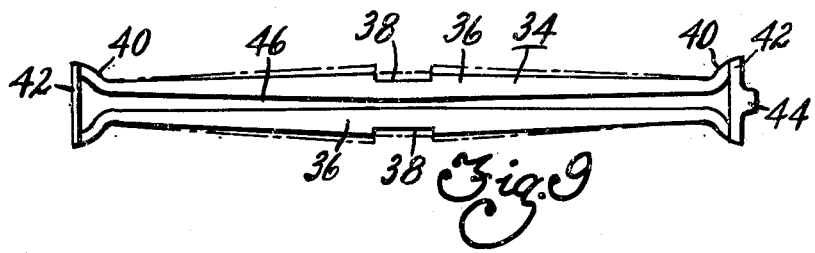
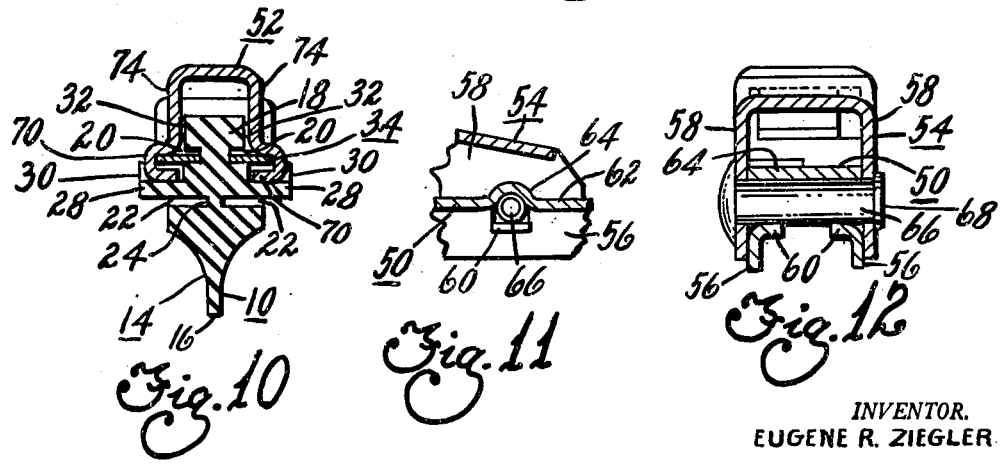
INVENTOR.
EUGENE R. ZIEGLER
BY
HIS ATTORNEY Oct. 30, 1962     E. R. ZIEGLER     3,060,480
WINDSHIELD WIPER BLADE
Filed July 24, 1959     3 Sheets-Sheet 3
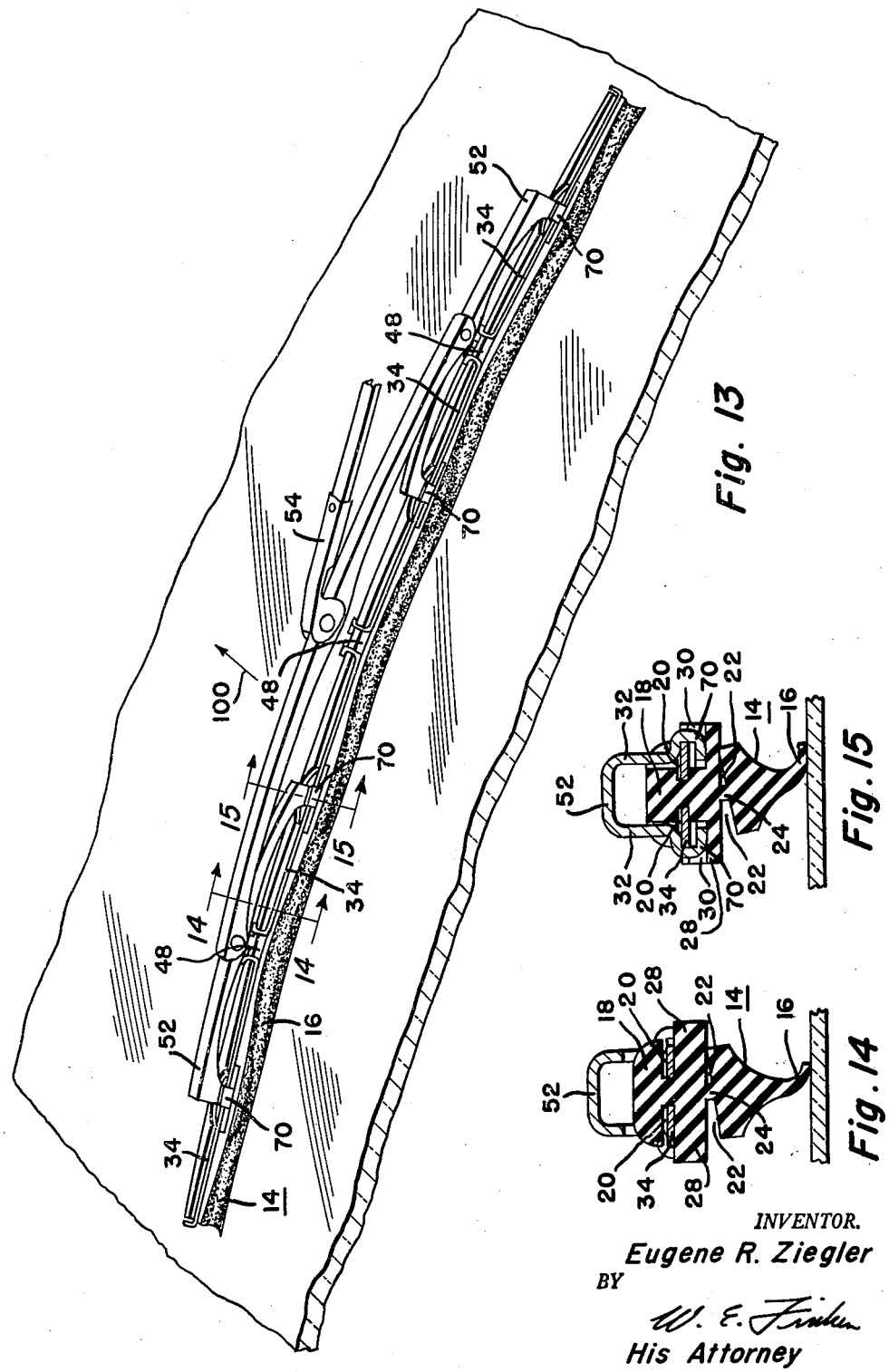
INVENTOR.
Eugene R. Ziegler
BY
W. E. Finken
His Attorney United States Patent Office 3,060,480
Patented Oct. 30, 1962

This invention pertains to windshield wiper blades, and particularly to a wiper blade capable of wiping either a flat surface or a surface having convex curvature.

Heretofore, windshield wiper blades designed for wiping flat surfaces as well as surfaces having convex curvature have embodied a squeegee unit comprising a freely flexible elastomeric wiping element and a backing connected to the squeegee element which is flexible in a plane normal to the surface of the windshield to be wiped and substantially inflexible, or rigid, in a plane parallel to the surface to be wiped. The squeegee unit is connected to a pressure applying superstructure at a plurality of spaced points, at least two of which are adjacent the ends thereof whereby the flexible backing will distribute wiper arm applied pressure substantially uniformly throughout the entire length of the squeegee unit. While this type of blade assembly is quite satisfactory in lengths of twelve inches or less, the distance between the pressure applying points is excessive in wiper blades of fifteen to eighteen inches in length when a triple yoke pressure applying superstructure is used, and if a superstructure is used to increase the pressure applying points to five or more, the over-all height of the blade between the wiping edge and the connector becomes excessive. In addition, the parts of the superstructure exposed to the wind present areas which tend to lift the wiper blade from the surface of the windshield at high vehicle speeds.

The present invention relates to a wiper blade assembly for wiping flat surfaces as well as surfaces having substantial convex curvatures wherein wiping pressure is applied to the wiper blade through a plurality of spaced apart backing strips which are sufficiently rigid so as to withstand flexing in a plane normal to the surface to be wiped under wiper arm pressure. Accordingly, among my objects are the provision of a wiper blade assembly designed for wiping flat and convex surfaces including means for applying wiper arm pressure uniformly to spaced apart lengths of the squeegee; the further provision of a wiper blade assembly designed for wiping flat and convex surfaces having limited lateral flexibility, or flexibility in a plane parallel to the surface to be wiped; the further provision of improved means for pivotally connecting the relatively movable parts of the pressure applying superstructure; the further provision of a skeletonized backing strip for a wiper blade assembly of the aforesaid type; the further provision of an improved squeegee unit including means to preclude engagement between the metal parts and the glass surface; and the still further provision of means for assembling the pressure applying superstructure to a squeegee unit comprising an elastomeric squeegee element having a plurality of spaced apart rigid backing strips loosely connected therewith.

The aforesaid and other objects are accomplished in the present invention by connecting the backing strips in end to end relation along the retention portion of the squeegee with the ends of the backing strips being spaced apart to provide limited lateral flexibility. Specifically, the wiper blade disclosed herein comprises an elongate, elastomeric squeegee having a wiping lip along one edge and an enlarged retention portion along the opposite edge. The retention portion is formed with longitudinal grooves extending throughout the length of the squeegee element for receiving the side rails of the skeletonized backing strips. In addition, the squeegee element is formed with a pair of longitudinally extending grooves located between the retention portion and the wiping lip, the grooves terminating short of the ends of the squeegee unit and forming a reduced neck portion facilitating movement of the wiping lip relative to the retention portion enabling the wiping lip to assume the proper drag position. By terminating the grooves which form the reduced neck portion short of the ends of the squeegee, the ends are reinforced to prevent excessive flexing of the end portions and preclude tearing of the squeegee at the reduced neck portion.

The backing strips are preferably formed of spring tempered stainless steel and comprise a pair of side rails of tapered cross-sectional area from the medial portion towards each end. The side rails are joined at each end by a cross strap, each cross strap having an integral tang, or lug, the purpose of which will be pointed out more particularly hereinafter. The medial portion of each side rail is formed with a notch constituting a seat for the end of a pressure applying member. The two end backing strips are formed with cross straps at one end which are bent throughout an angle of 90° so that the tangs, or lugs, form a stop which engages the end of the retention portion of the squeegee so as to prevent disassembly of the backing strips and the squeegee when the pressure applying superstructure is connected to the backing strips. The side rails of the backing strips are substantially flat and coplanar, and are of sufficient thickness so as to withstand flexing under the wiper arm pressure for which they are designed.

In the disclosed embodiment, the pressure applying superstructure comprises a primary yoke, or holder, having an arm attaching connector, and a pair of secondary yokes pivotally connected to the ends of the holder. The end of each secondary yoke is loosely connected with the medial portion of one of the backing strips. Since the backing strips do not flex under wiper arm applied pressure which is divided by the pressure applying superstructure so that one-fourth of the total arm pressure is exerted against each backing strip, the entire length of the squeegee beneath each backing strip is uniformly urged against the surface to be wiped. Substantially no conforming pressure is applied to the squeegee portions between the spaced ends of the backing strips. Moreover, the portions of the squeegee between the spaced ends of the backing strip are free to flex both laterally, or in a plane parallel to the surface to be wiped, as well as in a plane normal to the surface to be wiped.

When the wiper blade engages a surface of convex curvature, the wiping edge of the squeegee element will assume a concave form conforming with the convex curvature of the surface by flexing between the ends of the backing strip, and by slight deformation, or lateral flexing, of the wiping lip beneath the points of attachment between the secondary yokes and the backing strip. Since pressure is not applied adjacent the ends of the squeegee unit, the lengths of the secondary yokes and the primary yoke, or holder, are substantially less than would be required in a conventional type wiper blade thereby reducing the metal area subjected to cross winds during high speed vehicle operation, which cross winds tend to lift the wiper blade from the surface of the windshield.

Further objects and advantages of the present invention will be apparent from the following description, reference being had to the accompanying drawings wherein a preferred embodiment of the present invention is clearly shown, wherein similar reference numerals depict similar parts throughout the several views.

In the drawings:

FIGURE 1 is a top view of a wiper blade constructed according to the present invention.

FIGURE 2 is a side view, in elevation, of the windshield wiper blade engaging a flat surface under no wiper arm pressure.

FIGURE 3 is a sectional view taken along line 3—3 of FIGURE 2.

FIGURE 4 is a fragmentary side view, in elevation, of the wiper blade engaging a surface having convex curvature under wiper arm pressure.

FIGURE 5 is an enlarged view, in elevation, of a backing strip showing in phantom the strip stock from which it is made.

FIGURE 6 is a side view of the strip shown in FIGURE 5.

FIGURES 7 and 8 are, respectively, end views of the strip shown in FIGURE 6 taken in the direction of arrows 7 and 8, respectively.

FIGURE 9 is a top view of the backing strip with the side rails pinched together illustrating the manner in which the pressure applying superstructure is assembled with the backing strip.

FIGURE 10 is an enlarged, sectional view taken along line 10—10 of FIGURE 2.

FIGURE 11 is an enlarged sectional view taken along lines 11—11 of FIGURE 1.

FIGURE 12 is an enlarged sectional view taken along line 12—12 or FIGURE 2.

FIGURE 13 is a fragmentary view, partly in section and partly in elevation, depicting the manner in which the wiper blade conforms to a surface of convex curvature under wiper arm pressure as it is moved thereacross.

FIGURES 14 and 15 are enlarged, sectional views taken along lines 14—14 and 15—15, respectively, of FIGURE 13.

With reference to FIGURES 1 through 4, the wiper blade of the present invention includes a squeegee unit designated generally by the numeral 10 and a pressure applying superstructure designated by the numeral 12. The squeegee unit 10 comprises an elongate elastomeric squeegee 14 having a wiping lip 16 along one edge and an enlarged retention portion 18 along the opposite edge. The squeegee 14 may be composed of molded natural rubber, and the retention portion 18 is formed with a pair of longitudinal grooves 20 which extend throughout the entire length of the squeegee. A second pair of longitudinally extending grooves 22 are formed in the squeegee between the retention portion and the wiping lip, the grooves 22 terminating short of the ends of the squeegee unit as seen in FIGURES 2 and 3. The grooves 22 have a reduced neck portion 24 which permits the wiping portion to flex relative to the retention portion so that it will assume the proper drag position. The ends of the squeegee 14 are reinforced as indicated by numeral 26 to prevent excessive flexing, or yielding, thereof.

In addition, the retention portion of the squeegee 14 is formed with a pair of laterally extending flanges 28 disposed beneath the grooves 20, the width of the flanges 28 being greater than the claw portions of the pressure applying superstructure, as shown in FIGURE 10 so as to prevent engagement of the metal portions of the superstructure with the glass surface under excessive drag conditions. As seen in FIGURES 3 and 10, a portion of each flange 28 is removed at the connections between the ends of the pressure applying superstructure and the squeegee unit thereby forming arcuate cutouts 30. Arcuate cutouts 32 are also formed in the upper edge of the retention portion 18 to accommodate the ends of the pressure applying superstructure as shown in FIGURE 10.

The squeegee unit 10 also includes four skeletonized backing strips 34 composed of spring tempered stainless steel of sufficient thickness to resist flexing under normal wiper arm applied pressure of between sixteen and twenty ounces, of which each backing strip receives between four and five ounces.

With reference to FIGURE 5, the backing strips 34 are punched out of strip stock having a length and width indicated by the phantom lines. Each backing strip is formed with a pair of side rails 36 which are uniformly spaced apart throughout the major portion of the length of the strip. Each side rail is tapered from the middle towards the ends so that the middle portion of the rail has substantially twice the width of the end portions of the rail. In addition, the outer edge of the middle portion of each side rail is formed with a rectangular notch, or cutout, 38 to form interlocking shoulders for receiving the claw portions of the pressure applying superstructure.

The ends of the side rails 36 diverge along a radius as indicated by numeral 40 and are interconnected by a cross strap 42 having a tang portion 44 disposed in alignment with the slot 46 between the parallel inner edges of the side rails. The end backing strips for the squeegee have one end of the side rail portions 40 bent upwardly throughout an angle of 90° so that the tang 44 is located at right angles to the side rails 36 and is adapted to engage the end of the retention portion of the squeegee so as to prevent disassembly of the backing strips and the pressure applying superstructure from the squeegee after assembly. The inner end of each end backing strip, and both ends of the two intermediate backing strips have the side rail portions 40 bent upwardly 90°, and the cross straps 42 and the tangs 44 inwardly 90° relative to said rail portions 40 so as to form an opening for receiving the retention portion of the squeegee.

As seen in FIGURE 6, the side rails 36 are flat, or substantially planar. To form the squeegee unit, the four strips 34 are assembled with the retention portion 18 by engaging the side rails 36 in the longitudinally extending grooves 20 and sliding the backing strips relative to the squeegee so that the cutout portions 38 of the side rails are in alignment with the cutouts 30 and 32 in the squeegee element. The downwardly extending tangs 44 on opposite ends of the end backing strips will engage the end of the retention portion of the squeegee with the cutout portions 38 of the side rails properly located in alignment with the cutouts, 30 and 32 of the squeegee. It is pointed out that the skeletonized backing strips are arranged in end to end relationship along the retention portion of the squeegee, with the ends spaced apart to form hinge portions 48 which are free to flex in a plane normal to the surface to be wiped and in a plane parallel to the surface to be wiped. The relatively free normal and lateral flexibility of the hinge portions 48 enables the squeegee unit to conform to a surface having a convex curvature without flexing the backing strips 34.

With reference to FIGURES 2, 10 and 11, the pressure applying superstructure disclosed herein comprises a channel-shaped primary yoke, or holder, 50 having a pair of channel-shaped secondary yokes 52 pivotally connected at their medial portions to the ends thereof. A suitable wiper arm connector 54 which may be of the type disclosed in my co-pending application Serial No. 818,734, now abandoned, is pivotally attached to the center of the primary yoke 50 and is adapted to receive pressure from the terminal end of a wiper arm and distribute half of the wiper arm applied pressure to each end of the primary yoke. Since the ends of the primary yoke are connected to the center of the secondary yokes, the end of each secondary yoke will receive one-fourth of the total arm applied pressure.

The side walls 56 of the primary yoke are spaced apart a sufficient distance to loosely receive the channel-shaped secondary yokes in nesting relation. The pivotal connections between the wiper arm connector 54 and between the primary and secondary yokes are identical, and hence a description of one pivotal connection is deemed to suffice. As seen in FIGURE 12, the side walls 58 of the channel-shaped connector 54 straddle the side walls 56 of the primary yoke. A pair of inwardly extending lugs 60 are formed out of the side walls 56, and the top wall 62 is formed with an upwardly extending arcuate portion 64 as shown in FIGURE 11. A headed tubular rivet 66 is inserted through aligned holes in the side walls of the connector in engagement with the inner surface of the arcuate portion 64 of the top wall of the yoke and in engagement with the upper surface of the lugs 60. The other end of the rivet is peened as indicated by numeral 68. In addition, the top wall 62 of the primary yoke 50 is curved upwardly adjacent either end to facilitate pivotal movement of the secondary yokes about the axes of the rivets 66 and also from a stop limiting pivotal movement in one direction.

With reference to FIGURE 10, each end of both secondary yokes 52 is formed with a pair of claws 70 arranged to straddle the side rails 36 of the backing strips, and when assembled therewith lie within the notches 38. The claws 70 are slidable relative to the backing strip within the notches 38, and as seen in FIGURE 10 the inner surface of the upper portion of each claw engages the marginal edge of each side rail 36 for applying wiping pressure thereto. Furthermore, as seen in FIGURE 10, the transverse dimension of the flanges 28 on the squeegee is greater than the transverse dimension of the claws 70 so as to prevent engagement of the metal claws with the windshield surface and thus preclude scratching of the glass surface. Moreover, as shown in FIGURE 10, the side walls 74 of the secondary yokes do not engage the retention portion of the squeegee by virtue of the cutouts 32 therein.

Referring to FIGURE 9, the pressure applying superstructure comprising the primary yoke 50 and the secondary yokes 52, are assembled with the squeegee unit comprising the squeegee 14 and the backing strips 34 by hooking one of the claws over the end portion of one of the side rails 36 on each tapered backing strip 34. When the superstructure is moved laterally relative to the squeegee unit, so that the outer edge of the side rail engages the inner surface of the claw, the other side rail will easily fit within the space between the ends of the claw. Thereafter, the entire pressure applying superstructure is moved longitudinally relative to the squeegee unit causing the side rails of the backing strip to be moved towards each other as seen in FIGURE 9 until the claws are aligned with the notches 38 in the side rails at which time the side rails will snap back to their initial position as shown in FIGURE 5 to securely interlock each backing strip with one end of each secondary yoke. The backing strips are securely assembled with the squeegee after the pressure applying superstructure is interlocked therewith by virtue of the downwardly extending tangs 44 engaging opposite ends of the retention portion of the squeegee.

With reference to FIGURE 2, when the wiper blade engages a flat surface, each backing strip 34 distributes arm applied pressure substantially uniformly throughout the length of the backing strip. Substantially no wiping pressure is applied to the hinge portions 48 of the squeegee between the ends of the backing strip. As seen in FIGURE 4, when the wiper blade engages a surface having convex curvature the squeegee bends, or flexes, in a plane normal to the surface at the hinge portions 48. The backing strips 34, being substantially inflexible under wiper arm applied pressure, remain substantially flat, or planar. However, portions of the wiping lip 16 immediately beneath the ends of the secondary yokes are laterally deformed so that the wiping edge will conform to the convexly curved surface. Each backing strip distributes wiper arm pressure substantially uniformly throughout its length when the wiper blade engages a convex surface in the same manner as when it engages a flat surface. The lateral flexibility of the hinge portions 48 contributes to the ability of the wiper blade to adequately conform to convexly curved surfaces by preventing buckling, or kinking, of the wiping lip beneath the hinge portions.

When the wiper blade is moved across a convexly curved surface in the direction of arrow 100, as seen in FIGURE 13, the squeegee bends, or flexes, in a plane normal to the surface at the hinge portions 48. Moreover, the wiping lip 16 will be laterally flexed in a sinuous, or serpentine, manner throughout its length due to the application of pressure at the medial portion of each backing strip. Thus, as clearly shown in FIGURE 13, the wiping lip 16 of the squeegee will be bent in and out througout the length of the squeegee with the greatest lateral flexure occurring beneath the connections between the secondary yokes and the backing strips as seen in FIGURE 15, with progressively less lateral flexure of the wiping lip 16 towards the ends of each backing strip as seen in FIGURE 14. The least lateral flexure of the wiping lip 16 will occur beneath the hinge portions 48 since substantially no wiper pressure is applied thereto. Moreover, as seen in FIGURE 4, the loose connections between the claws 70 and the backing strips 34 will permit each backing strip to assume a position substantially tangent to its respective segment of the convexly curved surface.

From the foregoing it is apparent that the present invention provides a wiper blade which is capable of wiping flat as well as convexly curved surfaces and is uniquely adapted for blades having a length of fifteen inches or more since the over-all height of the blade between the wiper arm connector and the wiper lip is not excessive, and the relatively movable parts of the pressure applying superstructure can be made sufficiently small to prevent excessive lifting of the wiper blade due to cross winds.

While the embodiment of the invention as herein disclosed constitutes a preferred form, it is to be understood that other forms might be adopted.

What is claimed is as follows:

1. A windshield wiper blade including, an elongate freely flexible solid elastomeric squeegee having a wiping lip along one edge and a retention portion along the opposite edge, a plurality of backing members connected to the retention portion of said flexible body and arranged in end to end relationship with the ends being spaced apart to form hinge portions between the ends of said backing members which are flexible in a plane normal to the surface to be wiped and in a plane parallel to the surface to be wiped, said backing members and squeegee constituting a squeegee unit wherein relative movement between the retention portion of the squeegee and said backing strips is substantially precluded upon conformance of said squeegee unit with a convexly curved surface, and a pressure applying superstructure comprising a plurality of relatively movable members having their free ends loosely and slidably connected to said backing members, each backing member being connected to at least one free end of said relatively movable pressure applying members.

2. A windshield wiper blade including, a solid squeegee having a wiping lip along one edge and a longitudinally grooved retention portion along the opposite edge, a plurality of backing strips having side rails connected with the grooved retention portion of said squeegee with the ends of said strips being spaced apart to form hinge portions between the ends of said backing strips which are free to flex in a plane normal to the surface to be wiped and in a plane parallel to the surface to be wiped, said backing members and squeegee constituting a squeegee unit wherein relative movement between the retention portion of the squeegee and said backing strips is substantially precluded upon conformance of said squeegee unit with a convexly curved surface, and an arm-pressure applying superstructure comprising a plurality of relatively movable members having free ends, at least one free end being loosely connected to each backing strip.

3. A backing strip for a squeegee including, a one-piece metallic strip having a pair of side rails defining a groove therebetween, and cross straps at both ends of said strip integral with the side rails having integral tangs in alignment with said groove, one of said tangs being adapted to form a stop engageable with the end of the squeegee.

4. A backing strip for a squeegee including, a one-piece metallic strip having a pair of side rails defining a groove therebetween, each side rail being of varying cross-sectional area with the greatest cross-sectional area being adjacent the middle thereof and the smallest cross-sectional area being adjacent the ends thereof, and cross straps at both ends of said strip integral with the side rails having integral tangs in alignment with said groove, one of said tangs being adapted to be oriented in a plane normal to the plane of said rails to form a stop engageable with the end of the squeegee.

5. A backing strip for a squeegee including, a one-piece metallic strip having a pair of side rails of uniformly tapering cross-sectional area from the middle towards the ends thereof and defining a groove therebetween, and cross straps at both ends of said strip integral with the side rails having integral tangs in alignment with said groove, said cross straps being adapted to lie either in a plane normal to said rails or parallel to said rails whereby said cross straps form an entrance opening to said groove when they are parallel to said rails and one of said tangs is adapted to form a stop engageable with the end of the squeegee when said cross strap is located in a plane normal to said rails.

6. A backing strip for a squeegee including, a one-piece metallic strip having a pair of side rails defining a groove therebetween, each side rail having a notch in the outer edge of the medial portion thereof to receive connecting means from a pressure applying superstructure, and cross straps at both ends of said strip integral with the side rails, at least one of said cross straps having an integral tang in alignment with said groove and adapted to form a stop engageable with the end of the squeegee.

7. A windshield wiper blade assembly including, a squeegee having a wiping lip along one edge and a longitudinally grooved retention portion along the opposite edge, a plurality of spaced backing strips having side rails received within the grooved retention portion of the squeegee and arranged in end to end relation to form freely flexible hinge portions between the ends of said backing strips, said backing members and squeegee constituting a squeegee unit wherein relative movement between the retention portion of the squeegee and said backing strips is substantially precluded upon conformance of said squeegee unit with a convexly curved surface, and a pressure applying superstructure comprising a plurality of relatively movable members having free ends, at least one free end being loosely connected to each backing strip.

8. A squeegee unit for a wiper blade assembly including, an elongate freely flexible elastomeric squeegee having a wiping lip along one edge and a retention portion along the opposite edge, said retention portion having a pair of longitudinally extending backing strip receiving grooves, and a plurality of spaced backing strips having side rails disposed within the grooves of said retention portion and arranged in end to end relation to form freely flexible hinge portions between the ends of said backing strips, each backing strip having cross straps at both ends thereof integral with the side rails having integral tangs in alignment with the groove between said rails, the outer cross strap on each end backing strip being disposed in a plane normal to said rails whereby the tangs thereof form stops engageable with the ends of the retention portion of said squeegee, said backing members and squeegee constituting a squeegee unit wherein relative movement between the retention portion of the squeegee and said backing strips is substantially precluded upon conformance of said squeegee unit with a convexly curved surface.

9. A squeegee unit for a wiper blade assembly including, an elongate freely flexible elastomeric squeegee having a wiping lip along one edge and a retention portion along the opposite edge, said retention portion having a pair of longitudinally extending backing strip receiving grooves, and a plurality of spaced backing strips having side rails disposed within the grooves of said retention portion and arranged in end to end relation to form freely flexible hinge portions between the ends of said backing strips, the retention portion of the squeegee having integral longitudinally extending flanges with a transverse width greater than the width of said backing strips so as to preclude engagement between the backing strips and the surface to be wiped, each backing strip having cross straps at both ends thereof integral with the side rails having tangs in alignment with the groove between said rails, the outer cross strap on each end backing strip being disposed in a plane normal to said rails whereby the tangs thereof form stops engageable with the ends of the retention portion of said squeegee, the medial portion of the outer edge of each side rail on each backing strip having a notch therein for receiving connecting means from a pressure applying superstructure, said flanges and said retention portion of said squeegee having cutouts in alignment with each other and in alignment with the notches in the side rails of said backing strips.

10. A windshield wiper blade assembly including, an elongate freely flexible squeegee having a wiping lip along one edge and a retention portion along the opposite edge, the retention portion having longitudinally extending backing strip receiving grooves, a plurality of spaced backing strips having spaced apart side rails disposed within the grooves of said retention portion and arranged in end to end relation to form freely flexible hinge portions between the ends of said backing strips, each backing strip having a cross strap at each end thereof integral with the side rails, said backing members and squeegee constituting a squeegee unit wherein relative movement between the retention portion of the squeegee and said backing strips is substantially precluded upon conformance of said squeegee unit with a convexly curved surface and a pressure applying superstructure comprising a plurality of relatively movable members having their free ends loosely and slidably connected to said backing strips, each backing strip being connected to at least one free end of said relatively movable pressure applying members.

11. A windshield wiper blade assembly including, an elongate freely flexible squeegee having a wiping lip along one edge and a retention portion along the opposite edge, the retention portion having longitudinally extending backing strip receiving grooves, a plurality of spaced backing strips having spaced apart side rails disposed within the grooves of said retention portion and arranged in end to end relation to form freely flexible hinge portions between the ends of said backing strips, each backing strip having a cross strap at each end thereof integral with the side rails, at least the cross straps on the two end backing strips which are located adjacent the ends of the squeegee having integral tangs in alignment with the space between said side rails and located in planes normal to the plane of said side rails to form stops engageable with the ends of the retention portion of said squeegee, said backing strips and said squeegee constituting a squeegee unit wherein relative movement between the retention portion of the squeegee and said backing strips is substantially precluded upon conformance of said squeegee unit with a convexly curved surface, and a pressure applying superstructure comprising a plurality of relatively movable members having their free ends loosely and slidably connected to said backing strips, each backing strip being connected to at least one free end of said relatively movable pressure applying members.

12. A windshield wiper blade assembly including, an elongate freely flexible squeegee having a wiping lip along one edge and a retention portion along the opposite edge, the retention portion having longitudinally extending backing strip receiving grooves, a plurality of spaced backing strips having spaced apart side rails disposed within the grooves of said retention portion and arranged in end to end relation to form freely flexible hinge portions between the ends of said backing strip, each backing strip having a cross strap at each end thereof integral with the side rails, said backing members and squeegee constituting a squeegee unit wherein relative movement between the retention portion of the squeegee and said backing strips is substantially precluded upon conformance of said squeegee unit with a convexly curved surface and a pressure applying superstructure comprising a primary pressure distributing member and a plurality of secondary pressure distributing members pivotally connected to the primary pressure distributing member, the secondary pressure distributing members having free ends, at least one free end being loosely connected to each backing strip.

13. A windshield wiper blade assembly including, a freely flexible squeegee having a wiping lip along one edge and a retention portion along the opposite edge, said retention portion having longitudinally extending backing strip receiving grooves, a plurality of backing strips having spaced apart side rails received in the grooves of said retention portion and arranged in end to end relation to form freely flexible hinge portions between the ends of said backing strips, said backing members and squeegee constituting a squeegee unit wherein relative movement between the retention portion of the squeegee and said backing strips is substantially precluded upon conformance of said squeegee unit with a convexly curved surface, the outer edges of the side rails of each backing strip having aligned notches therein, and a pressure applying superstructure comprising a plurality of relatively movable members having claws at their free ends, the notched portions of each backing strip being loosely and slidably connected with at least one claw of said relatively movable pressure applying members.

14. A wiper blade assembly including a freely flexible squeegee having a wiping lip along one edge and a retention portion along the opposite edge, said retention portion having longitudinally extending backing strip receiving grooves, a plurality of spaced backing strips having spaced side rails disposed within the grooves of said retention portion and arranged in end to end relation to form freely flexible hinge portions between the ends of the backing strips, the side rails of each backing strip being of decreasing width from the medial portion thereof, the medial portion of said side rails having aligned notches in the outer edges thereof, and a pressure applying superstructure comprising a plurality of relatively movable members having claws at their free ends, at least one claw being loosely and slidably connected with the notched portions of said rails of each backing strip.

15. The wiper blade assembly set forth in claim 14 wherein each backing strip has a cross strap at each end integral with the side rails, and wherein said pressure applying superstructure is assembled with said backing strips by engaging the claws with the side rails at the ends thereof having a minimum width and effecting relative longitudinal movement between the superstructure and the backing strips and squeegee to thereby deform the backing strips until the claws are aligned with the cutouts in the outer edges of the side rails.

16. The windshield wiper blade set forth in claim 14 wherein each backing strip has a cross strap at each end of the strip integral with the side rails, and each cross strap has an integral tang in alignment with the space between said rails, the cross straps adjacent opposite ends of the squeegee being located in planes normal to said rails whereby said end tangs form stops engageable with the ends of the squeegee to prevent disassembly of the backing strips and pressure applying superstructure from the squeegee.

17. A backing strip for a squeegee including, a one-piece metallic strip having a pair of side rails defining a groove therebetween, and cross straps at both ends of said strip integral with the side rails having integral tangs in alignment with said groove, said cross straps being adapted to lie in either a plane normal to said rails or parallel to said rails whereby said cross straps form an entrance opening to said groove when they are parallel to said rails and one of said tangs is adapted to form a stop engageable with the end of the squeegee when said cross strap is located in a plane normal to said rails.

18. A windshield wiper blade assembly including, an elongated freely flexible solid elastomeric squeegee having a wiping lip along one edge and a retention portion along the opposite edge, a plurality of backing strips secured to the retention portion of said squeegee with the ends thereof being spaced apart, and a pressure applying superstructure comprising a plurality of relatively movable members having connection means loosely connected to the medial portion of each backing strip whereby, upon conformance of the wiper blade assembly with a convexly curved surface, the wiping lip of said squeegee will be laterally flexed in a serpentine manner throughout its length with the greatest lateral flexure of the wiping lip occurring beneath the connections between the pressure applying members and the backing strips.

19. A windshield wiper blade assembly including, an elongate freely flexible solid elastomeric squeegee having a wiping lip along one edge and a retention portion along the opposite edge, a plurality of backing strips secured to the retention portion of said squeegee with the ends thereof being spaced apart, and pressure applying superstructure comprising a primary pressure distributing member and a plurality of relatively movable secondary pressure distributing members having connection means loosely connected to the medial portion of each backing strip whereby, upon conformance of the wiper blade assembly with a convexly curved surface, the wiping lip of said squeegee will be laterally flexed in a serpentine manner throughout its length with the greatest lateral flexure of the wiping lip occuring beneath the connections between the secondary pressure distributing members and the backing strips.

20. A windshield wiper blade assembly including, an elongated freely flexible solid elastomeric squeegee having a wiping lip along one edge and a retention portion along the opposite edge, a plurality of backing strips secured to the retention portion of the squeegee with the ends thereof being spaced apart to form freely flexible hinge portions therebetween, and a pressure applying superstructure comprising a plurality of relatively movable members having connection means loosely connected to the medial portion of each backing strip whereby said backing strips will tilt and assume positions substantially tangent to segments of a convexly curved surface being wiped while said hinge portions flex in a direction normal to the convexly curved surface and the wiping lip is laterally flexed in a serpentine manner throughout its length with the greatest lateral flexure of the wiping lip occurring beneath the connections between the pressure applying members and the backing strips.

21. A windshield wiper blade assembly including an elongated freely flexible solid elastomeric squeegee having a wiping lip along one edge and a retention portion along the opposite edge, a plurailty of backing strips secured to the retention portion of the squeegee with the ends thereof being spaced apart to form freely flexible hinge portions therebetween, each backing strip having spaced side rails, and a pressure applying superstructure comprising a plurality of relatively movable members having claw means loosely and slidably connected with the side rails in the medial portion of each backing strip whereby the hinge portions will flex in a direction normal to a convexly curved surface being wiped and the wiping lip will be laterally flexed in a serpentine manner throughout its length with the greatest lateral flexure of the wiping lip occurring beneath the claw connections between the pressure applying members and the side rails in the medial portions of the backing strips.

References Cited in the file of this patent

UNITED STATES PATENTS

| | | |
|---|---|---|
| 2,634,446 | Mackie et al. | Apr. 14, 1953 |
| 2,672,641 | Scinta et al. | Mar. 23, 1954 |
| 2,739,337 | O'Shei | Mar. 27, 1956 |
| 2,807,821 | Scinta | Oct. 1, 1957 |
| 2,861,289 | Nesson | Nov. 25, 1958 |
| 2,918,688 | O'Shei | Dec. 29, 1959 |
| 2,925,615 | Krohm | Feb. 23, 1960 |

FOREIGN PATENTS

| | | |
|---|---|---|
| 1,096,321 | France | Jan. 26, 1955 |